June 19, 1928.
R. R. WEDDELL
1,674,350
UNIVERSAL GRINDING FIXTURE
Filed Aug. 27, 1925
2 Sheets-Sheet 1
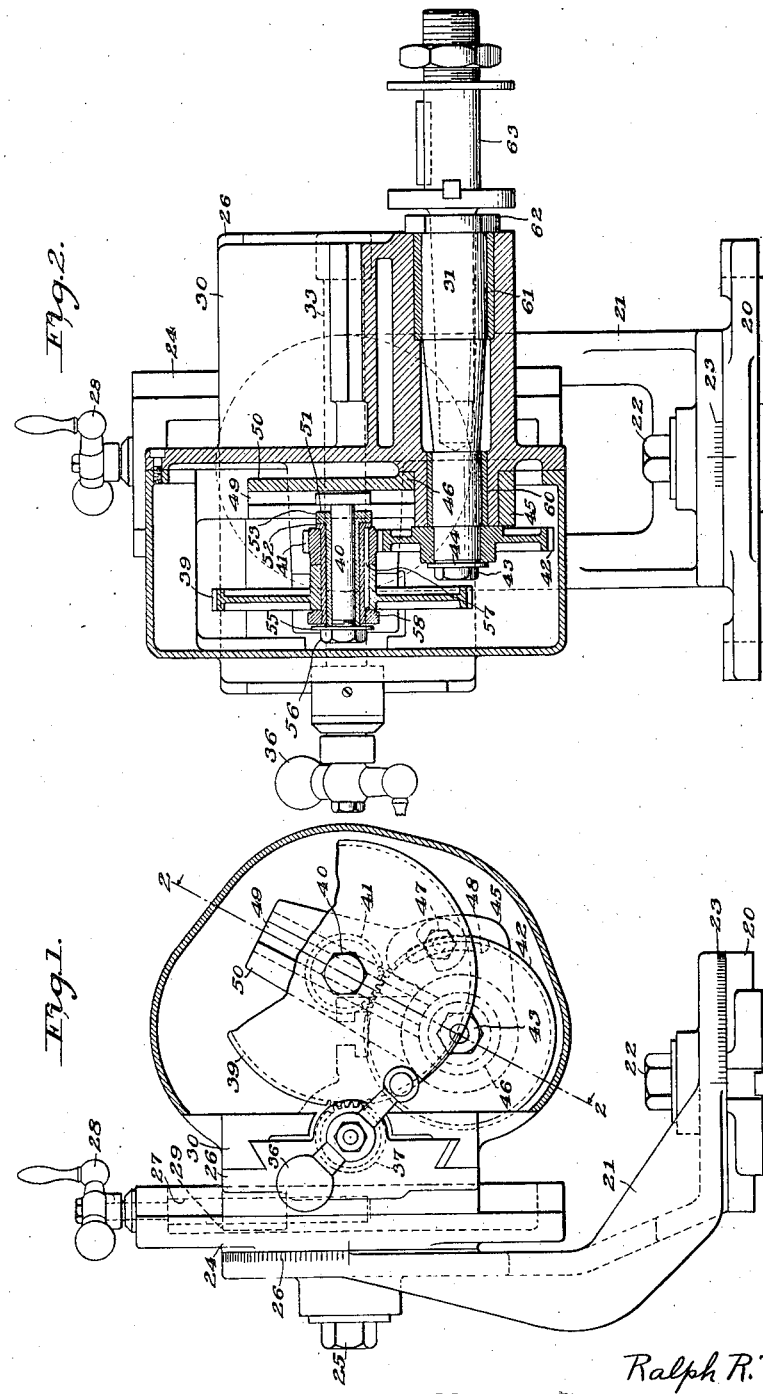
Inventor
Ralph R. Weddell
By Attorney
Albert F. Nathan June 19, 1928.
R. R. WEDDELL
1,674,350
UNIVERSAL GRINDING FIXTURE
Filed Aug. 27, 1925
2 Sheets-Sheet 2
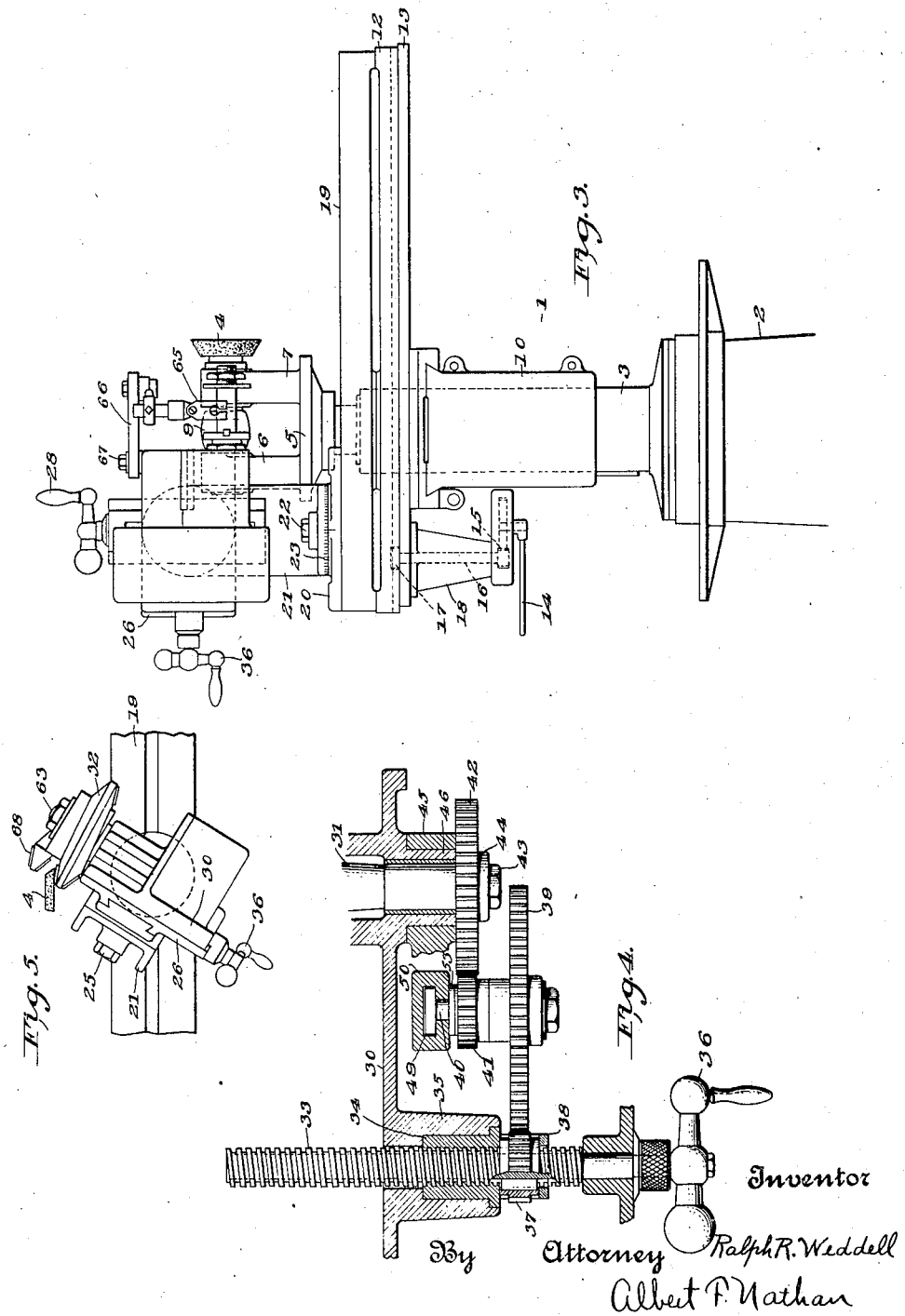
Inventor
Ralph R. Weddell
By Albert F. Nathan
Attorney Patented June 19, 1928.

1,674,350

UNITED STATES PATENT OFFICE.

RALPH R. WEDDELL, OF SHELTON, CONNECTICUT, ASSIGNOR TO THE O. K. TOOL COMPANY, INC., OF NEW YORK, N. Y., A CORPORATION OF NEW YORK.

UNIVERSAL GRINDING FIXTURE.

Application filed August 27, 1925. Serial No. 52,790.

My invention is concerned with grinding machines and it is particularly concerned with machines for grinding teeth on hobs.

In forming teeth on gear wheels it is desirable in many cases to roughly form the teeth on the gear wheels by means of a roughing hob. The teeth thus formed by a roughing hob may, if so desired, be ground or otherwise shaped to the exact desired contour.

My invention is chiefly concerned with a machine adapted to grind the teeth on a roughing hob. Such a hob, as above set forth, is chiefly used for roughing out the teeth on gear blanks. The teeth on the roughing hob do not need to be so shaped as to form exact involute gear teeth and need only to be so formed as to approximately cut involute gear teeth.

The mechanism proposed for grinding the teeth on roughing hobs is in the nature of an attachment which may be mounted on a suitable universal grinding machine. The attachment is so constructed as to facilitate the grinding of the sides and the tops of the teeth on a roughing hob. Preferably the grinding wheel, which may be of the so called cup type, is rotated on the bed of the machine and the hob spindle is adjusted with respect to the wheel for grinding the sides and the tops of the teeth. The hob is not rotated during a grinding operation.

Preferably in a machine constructed in accordance with my invention, a main horizontal slide is mounted on the bed of the machine. The main horizontal slide carries the hob or the hob section to be ground and is moved in any suitable manner to effect movement of a hob tooth with respect to the grinding wheel. The grinding wheel is rotated in any suitable manner and as above set forth is pivotally mounted directly on the bed of the machine. A bracket base is secured to the main horizontal slide and a main bracket is pivotally mounted on such base. Preferably graduations are formed on the bracket for assisting in accurately adjusting it with respect to the base on the main horizontal slide. The bracket pivotally supports an auxiliary base for an auxiliary slide which is adapted to move in a plane located perpendicularly to the plane of movement of the main horizontal slide. Preferably graduations are provided for insuring the accurate adjustment of the auxiliary slide base with respect to the bracket. The auxiliary slide, which moves in a plane perpendicular to the plane of movement of the horizontal slide, serves as a support for the spindle slide of the machine.

The spindle slide, which carries the hob spindle, is moved along the auxiliary slide by means of a lead screw. One lead screw is provided for mounting on the auxiliary slide to effect movement of the spindle slide irrespective of the lead of the teeth on the hob being ground. The hob spindle is rotated by the lead screw at a speed which is varied according to the lead on the teeth of the hob. Preferably, a pinion, which is splined to the lead screw, is mounted to move with the spindle slide. A set of change gears, which is mounted on the spindle slide and which is varied in accordance with the lead of the hob teeth, is provided for connecting the pinion to the hob spindle. The above described means for varying the relation between the movement of the spindle slide and the rotation of the hob spindle is one of the chief features of my invention. By varying the change gears it is unnecessary to change the lead screw each time a hob of a different lead is ground. Moreover the providing of one lead screw for all hobs of different leads simplifies the construction of the attachment which is adjusted in various positions to grind the hob teeth.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is an end view of a grinding attachment constructed in accordance with my invention. Fig. 2 is a sectional view along the line 2—2 of Fig. 1. Fig. 3 is an elevational view of the adjustment mounted on an universal grinding machine. Fig. 4 is a sectional view showing the change gear connection between the lead screw and hob spindle. Fig. 5 is a plan view of the attachment mounted in position on an universal grinding machine.

Referring to the accompanying drawings and particularly to the Figs. 1 and 3, a grinding machine 1 is illustrated comprising a bed 2 from which projects a post or pillar 3. A suitable grinding wheel 4, which is illustrated as a cup shape grinding wheel, is pivotally mounted on a reduced top portion of the post 3. A wheel base 5, which is pivotally mounted on the top of the post 3, is provided with two projecting arms 6 and 7. The arms 6 and 7 provide bearings for the shaft 8 of the grinding wheel 4. A pulley 9, which is mounted on the shaft 8 between the two arms 6 and 7, is connected by a belt to any suitable source of power.

A bracket 10, which is slidably mounted on the post 3, carries a main horizontal slide 12. The main horizontal slide 12 is mounted on a base 13 and is operated by a hand lever 14. The hand lever 14 is connected through gear wheels 15, a shaft 16, and a pinion 17 to a rack carried by the horizontal slide 12. The hand lever 14 and the parts connected thereto are mounted on a bracket 18 projecting from the base 13. A plate 19, which is swivelled on the slide 12 serves as a support for a bracket base 20. The slide structure above described is common to universal grinding machines and further description thereof is deemed unnecessary.

The bracket base 20, which is mounted on the support 19, carries a main bracket 21. The main bracket 21 is swivelled on the base 20 by means of a suitable bolt 22 and preferably graduations 23 are formed on the bracket for assisting in accurately adjusting the bracket with respect to the base. The bracket 21 is adjusted about the bolt 22 in accordance with the angle of the sides of the hob teeth being ground. The bracket 21 carries an auxiliary base 24 as shown in Fig. 1 of the drawings. The auxiliary base 24 is pivotally mounted on the bracket 21 by means of a bolt 25 and carries an auxiliary slide 26. Preferably, graduations 26' are formed on the top portion of the bracket 21, as indicated in Fig. 1 of the drawings, in order to accurately position the auxiliary base 24 with respect to the main bracket. A screw shaft 27, which is mounted on the auxiliary base 24 and which is operated by a hand lever 28, is connected to the auxiliary slide 26 by means of a suitable nut 29. It is apparent the auxiliary base 24 may be adjusted on the bracket 21 to permit movement of the auxiliary slide 26 by means of the handle 28 in any desired direction in a vertical plane. The auxiliary base 24 is adjusted on the bolt 25 in accordance with the relief which is desired to be formed on the teeth of the hob being ground. The auxiliary slide 26 carries a spindle slide 30 which is movable in a plane parallel to the plane of movement of the auxiliary slide and in a direction perpendicular to the direction of movement of the auxiliary slide. The spindle slide 30 carries a hob spindle 31 on which is mounted a hob 32 as shown in Fig. 5 of the drawings.

A lead screw 33, which is suitably supported on the auxiliary slide 26, is connected to the spindle slide 30 by means of a nut 34, as shown in Fig. 4 of the drawings. The nut 34 is rigidly secured in a hub 35 forming a part of the slide 30. The lead screw 33 is operated by means of a suitable hand lever 36. In grinding the teeth of a hob it is essential to effect a rotation of the hob spindle in accordance with the longitudinal movement of the spindle. In the attachments heretofore proposed it has been necessary to change the lead screw each time a change was made in the lead of the teeth on the hob being ground. Thus, it has been necessary to provide a separate lead screw for each hob having a different lead. In the invention disclosed, one lead screw is provided for hobs of any lead and a variable speed transmission is provided between the lead screw and the hob spindle for varying the rotation of the hob spindle in accordance with the lead on the hob teeth.

A pinion 37, which is splined to the lead screw 33, is secured in position by a bracket 38 and the hub 35 to effect movement in accordance with the movement of the spindle slide 30. Thus, the pinion 37 is rotated in accordance with the rotation of the lead screw and is moved linearly in accordance with the movement of the spindle slide 30. The pinion 37 directly meshes with a gear wheel 39 which is carried by a T bolt 40. The gear wheel 39 is connected in a manner to be hereinafter set forth to a gear wheel 41 which is also mounted on the T bolt 40. The gear wheel 41 meshes with a gear wheel 42 which is secured to the end of the hob spindle 31. The gear wheel 42 is held in position on the hob spindle by means of a bolt 43 and a washer 44. A quadrant member 45 is adjustably mounted on a hub 46 which projects from the slide 30 as shown in Figs. 2 and 4 of the drawings. A bolt 47, which projects through an arcuated slot in the quadrant, serves to hold the quadrant in any set position. A T slot 49, which is formed in an arm 50 of the quadrant member, is adapted to receive the head of the T bolt 40. The T bolt 40 carries two bushings 51 and 52. The bushing 51 is directly mounted on the T bolt and is provided with a shoulder 53. The shoulder 53 is held in engagement with the arm 50 of the quadrant member 45. The opposite end of the bushing 51 is engaged by a washer 55 and a nut 56 on the end of the T bolt 40. By operating the nut 56 it is apparent the T bolt 40 is securely clamped in position in the T slot 49. The bushing 52 is rotatably mounted on the bushing 51 and the two gear wheels 41 and 39 are secured to the bushing 52 by means of a key member 57, as shown in Fig. 2 of the drawings. A nut 58, which is threaded to the bushing 51, serves to hold the two gear wheels 39 and 41 in position on the bushing 52.

The gear wheels 39, 41 and 42 may be varied in accordance with the lead on the teeth of the hob being ground. As before set forth it is necessary to vary the relative linear movement of the hob spindle with respect to the rotative movement thereof in accordance with the lead on the teeth on the hob. It has been found that a very few gears are required to operate the spindle at the required speeds for a number of different leads on the hobs being ground. The hob spindle 31 is mounted in bushings 60 and 61 on the slide 30, as shown in Fig. 2 of the drawings. The spindle is held in position between a shoulder 62 thereon and the bolt 43. An arbor 63 is mounted in the spindle by means of a suitable tapered fit in accordance with usual practice. The arbor 63 may be varied in accordance with the hob being ground.

A spring pressed finger 65 of usual construction is mounted on the auxiliary slide 26 for holding the hob in the various grinding positions. The base 66 is secured to the slide 26 by a bolt 67. The operation and construction of such spring finger is old and well known in the art and accordingly a description thereof is deemed unnecessary. When grinding one side of the teeth 68 on the hob 32, the grinding wheel 4 is adjusted on the top of the post 3 to the position illustrated in Fig. 5 of the drawings. The bracket 21 is adjusted about the bolt 22 in accordance with the side angle of the teeth 68. A third angular adjustment is made of the auxiliary base 24 on the bracket 21. The auxiliary base 24 is adjusted in accordance with the relief which is to be formed on the sides of the hob teeth. When the attachment and the grinding wheel is so adjusted a tooth on the hob 32 is held in a horizontal position by means of the spring finger 65 in a well known manner. The hob tooth is moved along the grinding wheel by operating the slide 12. The remaining hob teeth are then indexed and ground until one side of each of the hob teeth have been ground. A similar setting to that above described is made for grinding the opposite sides of the hob teeth. After the sides of the hob teeth have been ground and shaped in the above described manner the grinding wheel and the attachment are adjusted to grind the tops of the hob teeth. Although my invention is particularly adapted for grinding inserted teeth on hobs it is to be understood that it may be used for other purposes within the scope of the invention.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a machine for grinding hob teeth, the combination comprising a support; a spindle slide mounted on said support; a lead screw mounted on said support for operating said slide; manually operable means for rotating said screw; a hob spindle mounted on said spindle slide; and means comprising a set of change gears for rotating the hob spindle from the lead screw; said change gears being varied in accordance with the lead on the hob to be ground.

2. In a machine for grinding hob teeth, the combination comprising a support; a lead screw rotatably mounted on said support; a spindle slide mounted on said support and operated by said lead screw; a pinion having a spline connection with said lead screw and moved with said spindle slide; a hob spindle mounted on said slide, and change gears for rotating said hob spindle from said lead screw.

3. In a machine for grinding hob teeth, the combination comprising a support; a spindle slide mounted on said support; a lead screw for operating said slide; manually operable means for rotating said lead-screw; a hob spindle mounted on said slide; a pinion moved in accordance with the movement of said slide and rotated by said lead screw; and change gears mounted on said slide for connecting said pinion to the hob spindle.

4. In a machine for grinding hob teeth, the combination comprising a support; a spindle slide mounted on said support; a lead screw mounted on the support for operating said slide; a hob spindle mounted on said slide; a pinion moved in accordance with the movement of said slide and rotated by said lead screw; operative mechanism connecting said pinion to said spindle for rotating the latter; and means for varying the speed ratio of said mechanism, whereby the rotative movement of the hob spindle relative to the linear movement thereof may be varied according to the lead of the hob being ground.

5. In a machine for grinding hob teeth, the combination comprising a support; a spindle slide mounted on said support; means mounted on said support for moving the slide along the support; a pinion mounted to move with said slide and rotated in accordance with the operation of said slide moving means; a hob spindle mounted on said slide; and means comprising change gears for actuating said slide moving means from said pinion.

6. In a machine for grinding hob teeth, the combination comprising a support; a spindle slide mounted on said support adapted to carry a hob; means adapted to engage a hob tooth to support it during grinding operation; a lead screw mounted on the support for operating said slide; means comprising change gears mounted on said slide for rotating the hob spindle from the lead screw; and means connected to operate said lead screw whereby the hob teeth are successively moved adjacent said tooth engaging means.

7. In a machine for grinding hob teeth, the combination comprising a support; a spindle slide mounted on said support; a lead screw mounted on the support for operating said slide; a lever connected to said screw for manually rotating said screw; a pinion having a spline connection with said screw and mounted to move with said slide; and means comprising change gears mounted on said slide for connecting the pinion to the hob spindle.

8. In a machine for grinding hob teeth, the combination comprising a support; a spindle slide mounted on said support; a lead screw mounted on the support and connected to the slide for operating the latter; a pinion having a spline connection with said screw and mounted to move with said slide; a hob spindle mounted on said slide; and means for connecting said pinion to the hob spindle to effect rotation of the spindle in accordance with the movement of the slide; said means being varied to give the slide movement corresponding to the lead on the hob teeth.

9. In a machine for grinding hob teeth, the combination comprising a bracket base; a main bracket pivotally mounted on said bracket base; an auxiliary base pivotally mounted on said main bracket; an auxiliary slide mounted on said auxiliary base; means comprising a screw shaft for effecting movement of the auxiliary slide on the auxiliary base; a spindle slide slidably mounted on said auxiliary slide; a lead screw mounted on the auxiliary slide and connected to said spindle slide for effecting operation of the latter; a hob spindle mounted on said spindle slide; and a change gear transmission means for connecting said lead screw to the hob spindle.

10. In a machine for grinding hob teeth, the combination comprising an auxiliary base; an auxiliary slide movable on said auxiliary base; a spindle slide mounted on said auxiliary slide to have movement in a plane parallel to the plane of movement of the auxiliary slide and in a direction at right angles to the direction of the auxiliary slide movement; a lead screw mounted on said auxiliary slide and connected to said spindle slide for moving the latter along the slide; a hob spindle mounted on said spindle slide; and a change gear transmission for connecting said lead screw to the spindle to effect rotation of the spindle in accordance with the movement of the spindle slide, said change gears being varied in accordance with the lead of the teeth on the hob being ground.

11. In a machine for grinding hob teeth, the combination comprising a bracket; a base pivotally mounted on said bracket; an auxiliary slide mounted for movement on said base; a spindle slide mounted on said auxiliary slide to have movement in a plane parallel to the plane of movement of the auxiliary slide; a lead screw mounted on said auxiliary slide and connected to said spindle slide for moving the latter along the auxiliary slide; a hob spindle mounted on said spindle slide; transmission means connecting said lead screw to said spindle to effect rotation of the spindle in accordance with the movement of the spindle slide; and means for changing the speed ratio of said transmission means whereby the spindle may be caused to move in a manner corresponding to the lead of the hob.

12. In a machine for grinding hob teeth, the combination comprising a bracket; means for pivotally supporting said bracket; a base pivotally mounted on said bracket, said base being pivoted in a plane at right angles to the plane of movement of the bracket; an auxiliary slide mounted to have movement on said base; a spindle slide mounted on said auxiliary slide to have movement in a plane parallel to the plane of movement of the auxiliary slide; a lead screw mounted on said auxiliary slide and connected to said spindle slide for moving the latter along the auxiliary slide; a hob spindle mounted on said spindle slide; and means comprising change gears for connecting the lead screw to the spindle to effect rotation of the spindle in accordance with the movement of the spindle slide, said change gears being varied in a predetermined relation to the lead of the teeth on the hob.

13. In a machine for grinding hob teeth, the combination comprising a horizontal slide having a bracket base secured thereto; a bracket pivotally supported on said bracket base; an auxiliary base pivotally mounted on said bracket, said auxiliary base being pivoted in a plane at right angles to the plane of rotation of the bracket; an auxiliary slide mounted to have movement on said auxiliary base; a spindle slide mounted on said auxiliary slide to have movement in a plane parallel to the plane of movement of the auxiliary slide; a lead screw mounted on said auxiliary slide and connected to said spindle slide for moving the latter; a hob spindle mounted on said spindle slide; and means comprising change gears for connecting the lead screw to the spindle to effect rotation of the spindle in accordance with the movement of the spindle slide, said change gears being varied in a predetermined relation to the lead of the teeth on the hob.

14. In a machine for grinding hob teeth, the combination comprising a spindle slide; a supporting base for said slide; means for swivelling said base in two planes located perpendicularly to each other; a lead screw mounted on said base for effecting movement of the slide; a hob spindle mounted on said slide; and change gears mounted on said slide for connecting the lead screw to said spindle, said change gears being varied whereby the spindle receives a movement corresponding to the lead of the teeth on the hob.

15. In a machine for grinding hob teeth, the combination comprising a spindle slide; a supporting base for said slide; a lead screw mounted on said base for effecting movement of said slide in the plane of said base; means for supporting said base to permit adjustment thereof about an axis located perpendicularly to the plane of movement of the slide; a hob spindle mounted on said slide; and change gears mounted on said slide for connecting the lead screw to said spindle, whereby the rotative movement of the hob spindle relative to the linear movement thereof may be varied to correspond with the lead of the teeth on the hob.

16. In a machine for grinding hob teeth, the combination comprising a spindle slide; a vertically arranged supporting base for said slide; a lead screw mounted on said base for effecting movement of said slide in the plane of said base; means for supporting said base to permit adjustment thereof about a vertical axis; a hob spindle mounted on said slide; and change gears mounted on said slide for connecting the lead screw to said spindle, said change gears being varied in accordance with the lead of the teeth on the hob.

17. In a machine for grinding hob teeth, the combination comprising a main frame; a rotating grinding wheel pivotally mounted on said frame; a spindle slide having a hob spindle mounted thereon; means for supporting said slide to permit rotary adjustment of the slide about an axis; means to permit rotary adjustment about a second axis perpendicular to said first named axis; means to permit linear movement of the slide in a plane; means to permit linear movement in a second plane perpendicular to said first named plane; a lead screw for effecting the movement of said slide in said first named plane; and change gears for rotating said spindle from said lead screw.

18. In a machine for grinding hob teeth, the combination comprising a main frame; a rotating grinding wheel mounted on said frame; a spindle slide having a hob spindle mounted thereon; means for supporting said slide on the frame to permit rotary adjustment of the slide about an axis; means to permit rotary adjustment about a second axis perpendicular to said first named axis; a lead screw for effecting movement of the slide on its supporting means; and change gears mounted on said slide for connecting the lead screw to said spindle, said change gears being varied to secure a predetermined movement of said spindle corresponding to the lead of the teeth on the hob.

19. In a machine for grinding hob teeth, the combination comprising a main frame; a rotating grinding wheel mounted on said frame; a spindle slide having a hob spindle mounted thereon; means for supporting said slide on the frame to permit linear movement of the slide in a plane; means for causing linear movement of said slide in a plane perpendicular to said first named plane; a lead screw for effecting movement of the slide on its supporting means; and change gears mounted on said slide for connecting the lead screw to said spindle, said change gears being varied to effect movement of said spindle to correspond with the lead of the teeth on the hob.

20. A unit for adjustably supporting hobs during the grinding operation thereof combining means for removably securing said unit to a machine tool; a spindle slide; a hob spindle thereon; means for translating said slide comprising a lead screw and co-operative nut; manually operable means mounted on said fixture for operating said translating means; means for rotatably adjusting said slide about an axis transverse to said translatory movement; and change gear means for operably connecting said translating means and hob spindle whereby the rotative movement of the latter relative to the linear movement may be varied according to the lead of the hob.

21. A fixture for grinding hob teeth adapted to be removably secured to a machine tool comprising a spindle slide mounted on said fixture; a lead screw mounted on said slide; manually operable means mounted on said fixture for rotating said screw; a hob spindle on said slide; and change gears operably connecting said lead screw and spindle whereby the rotative movement of the hob spindle relative to the linear movement thereof may be varied in accordance with the lead of the hob being ground.

In witness whereof, I have hereunto subscribed my name.

RALPH R. WEDDELL.